Aug. 3, 1926.  
E. B. RAYNER  
1,594,753
VARIABLE SPEED TRANSMISSION MECHANISM
Filed July 2, 1925  2 Sheets-Sheet 1
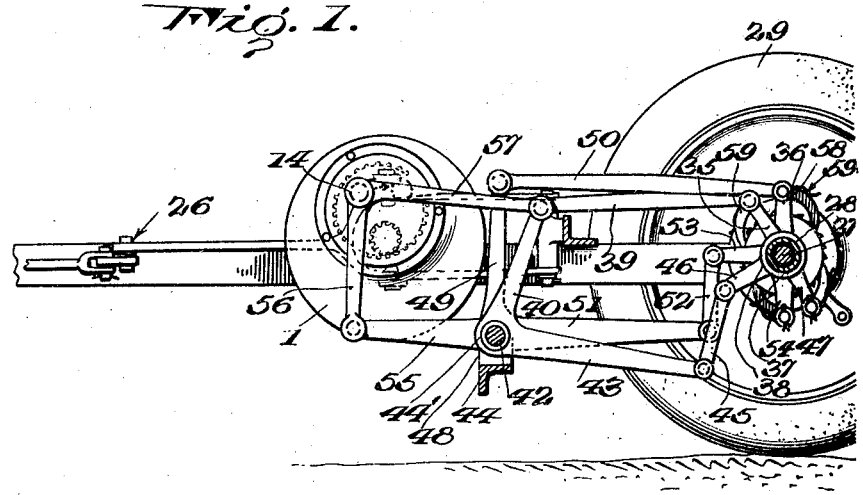
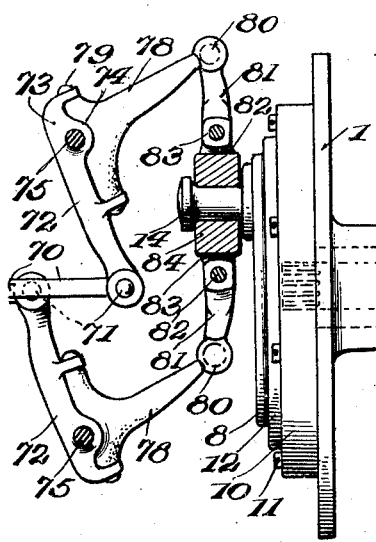
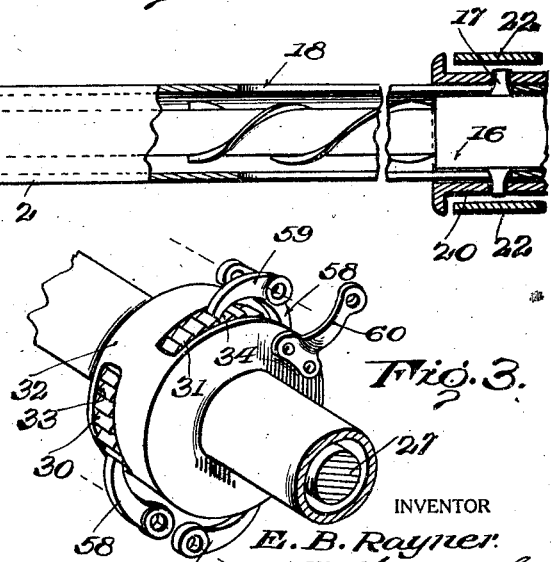
WITNESSES  
W. A. Williams
INVENTOR  
E. B. Rayner  
BY  
ATTORNEYS

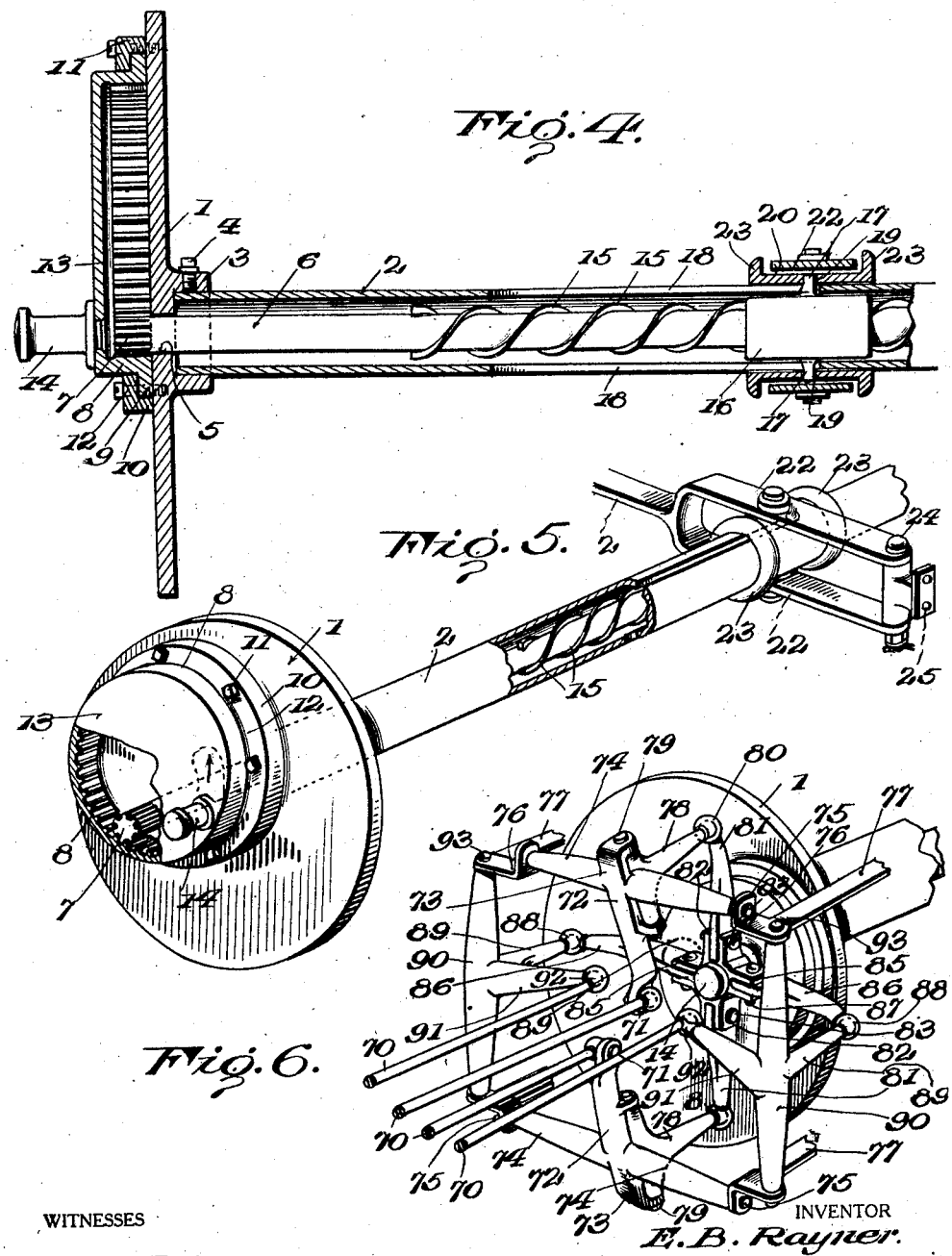

Patented Aug. 3, 1926.

1,594,753

UNITED STATES PATENT OFFICE.

EDWIN B. RAYNER, OF PIQUA, OHIO.

VARIABLE-SPEED-TRANSMISSION MECHANISM.

Application filed July 2, 1925. Serial No. 41,143.

My invention relates to improvements in variable speed transmission mechanisms of the type having means for transmitting motion from a rotating drive member to a rotary member that is to be driven, and it consists in the combinations, constructions and arrangements herein described and claimed.

An object of the invention is the provision of a transmission mechanism of the character described, which can be adjusted while the drive member is rotating at a constant speed either to render the transmission mechanism ineffective to transmit motion to the member that is to be driven, or to cause rotation of the member that is to be driven at a speed which can be varied as desired, from zero to a speed which is but slightly less than that of the drive member.
A further object of the invention is the provision of a transmission mechanism of the character described which can be adjusted while the drive member is rotating in a given direction to cause rotation of the driven member in either of opposite directions, as desired.

A still further object of the invention is the provision of a transmission mechanism of the character described which when adjusted to cause rotation of the driven member in a given direction, will function to drive the driven member in that direction irrespective of any direction of rotation of the drive member.
Other objects and advantages of the invention will be apparent from the following description, considered in conjunction with the accompanying drawings, in which:

Figure 1 is a view, mainly in side elevation and partly in vertical section, showing a transmission mechanism embodying the invention in position to transmit motion from a rotating crank disk to the axle of a wheeled vehicle when the axes of rotation of the crank disk and the axle are parallel, Figure 2 is a relatively enlarged view showing the driving means of the transmission mechanism in association with motion transmitting members for transmitting motion from the crank disk to a rotary member which may have the axis of rotation thereof disposed at right angles to the axis of rotation of the crank disk, Figure 3 is a fragmentary perspective view showing certain elements of the pawl and ratchet wheel arrangement that the invention provides for imparting a torque to a rotary member to cause rotation of the rotary member in either of opposite directions, as desired,

Figure 4 is a longitudinal vertical section through the driving means which is exhibited in each of the constructions respectively shown in Figures 1 and 2, showing also means for adjusting the crank pin radially of the crank disk, Figure 5 is a perspective view of the driving means exhibited in Figure 4 with a portion of a tubular shaft of said driving means broken away to disclose parts located therein, and Figure 6 is a fragmentary perspective view showing a portion of the structure exhibited in Figure 2, together with additional elements for transmitting motion from the crank disk to a rotary member that is disposed with the axis of rotation thereof at right angles to the axis of rotation of the crank disk.

The invention contemplates the provision of a crank disk on which the crank pin is supported for adjustment radially of the crank disk from a position in axial alinement with the axis of rotation of the crank disk to a position near the outer edge of the crank disk, together with means whereby the position of the crank pin on the crank disk can be adjusted radially as desired, and motion will be transmitted from the rotating crank disk to a rotary member that is to be driven.

The driving mechanism of the device includes a crank disk 1 which is secured to an end portion of a hollow rotary shaft 2 in any suitable known manner as by having a central laterally extending tubular boss 3 in which an end portion of the tubular shaft 2 is received and secured by means of a set screw 4. The crank disk is formed with a central opening 5 through which the shaft 6 that is partially disposed in the tubular shaft 2 extends, the shaft 6 being concentric to the tubular shaft 2, and also concentric with the crank disk 1. The shaft 6 carries a pinion 7 which is located within an internal ring gear 8 in mesh with the teeth on the inner periphery of the ring gear. The internal ring gear 8 is formed with an oppositely extending annular flange 9 at its inner edge which is rotatably received in a ring guide 10. The latter is secured, as by means of the cap screws 11, to the crank disk 1 on one face of the latter in eccentric relation to the crank disk so that the space within the ring gear will extend across the axial line of the crank disk, the ring guide including an inwardly extending annular flange 12 at its outer edge engaging with the outer side of the flange 9, and cooperating with the latter to retain the ring gear close to the adjacent face of the crank disk 1. The ring gear 8 may be formed with an integral web or end wall 13 at its outer end. A crank pin 14 is secured to this web or end wall 13 of the ring gear adjacent to the juncture of the web 13 with the ring gear, so that the crank pin 14 will be in position to be axially alined with the shaft 6, and therefore with the axis of rotation of the crank disk 1 when the ring gear 8 is in the position shown in Figure 4 and the rotation of the ring gear about its axis in the frame 10—12 will cause the crank pin to be shifted radially of the crank disk.

The rotation of the ring gear, and therefore the shifting of the crank pin radially of the crank disk can be effected by turning the shaft 6 about its axis. To this end, a portion of the shaft 6 is formed with spaced spiral threads 15, and an actuating sleeve or nut 16 having grooves in its inner wall in engagement with the threads 15 is mounted on shaft 6 within the tubular shaft 2 and is held against rotation by means of opposite radial projections 17 which extend through longitudinal slots 18 in the tubular shaft 2, and are received in openings 19 in an outer sleeve 20. The sleeve 20 is slidable on the tubular shaft 2, and it is obvious that the sliding of the sleeve 20 on the tubular shaft 2 will cause a like movement of the nut or inner sleeve 16, and that the movement of the latter will cause rotation of the shaft 6 and of the pinion 7. The rotation of the pinion 7 will cause the internal ring gear 8 to be rotated and the degree of eccentricity of the crank pin 14 to the crank disk 1 thus can be varied at will within a considerable range.

The shifting of the outer sleeve 20 may be effected by a person who is remote from the shaft 2 by means of a shifter lever 21 having forks 22 straddling the outer sleeve 20 and loosely received between outwardly extending flanges 23 on the sleeve 20, the ends of the forks 22 being pivotally supported at 24 on a fixed support 25 so that the shifter lever 21 can be swung in a plane extending through the axis of the tubular shaft 2 and movement thus may be imparted to the outer sleeve 20 to cause the latter to be slid along the tubular shaft 2. The shifter lever 21 may be connected with suitable operating linkage such as indicated generally at 26 in Figure 1 to permit the actuation of the lever 21 from a distance from the tubular shaft 2.

In Figure 1, I show the means now preferred by me for transmitting motion from the crank disk 1 through the crank pin 14 to a rotary member which is located with the axis thereof parallel to the axis of rotation of the crank disk and which is shown as having an axle 27 mounted in a tubular housing 28 and supported on wheels, such as that indicated at 29. A pair of juxtaposed ratchet wheels 30 and 31 respectively are secured on the axle 27 within a shiftable drum-shaped ratchet wheel housing 32 which can be shifted rotatably about the axis of the axle 27 for a purpose to be presently described. The ratchet wheels 30 and 31 have the teeth thereon facing in opposite directions as best seen in Figure 3, and the cylindrical body of the drum-shaped housing is formed with two sets of opposite slots 33 and 34, respectively, the respective slots 33 and 34 being disposed in staggered relation circumferentially of the drum-shaped housing with the slots 33 located in the plane of the ratchet 30 and the slots 34 located in the plane of the ratchet 31.

A pair of arms 35 and 36 respectively are supported at their inner ends to swing about the axis of the axle 27. A pair of bell cranks 37 and 38 respectively likewise are supported to swing about the axis of the axle 27. A connecting rod 39 connects the outer end of the swingable arm 35 with the upper end of the upstanding arm 40 of an L-shaped bell crank which is fulcrumed on a pivot element 42 and has the other arm thereof, indicated at 43, extending in the general direction of the axle 27. The pivot element 42 is parallel to the axis of the axle 27 and of the axis of rotation of the crank disk 1, and is disposed between the crank disk 1 and the axle 27 in a plane lower than that of the axis of rotation of either the crank disk or the axle.

This pivot element 42 is carried by a stationary support such as indicated at 44. The arm 43 of the bell crank is connected at its extremity by means of a link 45 with the outer end of an arm 46 of the bell crank 37, so that the other arm, indicated at 47 of the bell crank 37, will be disposed substantially diametrically opposite to the arm 35 and will depend from the axle 27 while the arm 35 extends above the axle 27. The pivot member 42 also serves as a fulcrum for a bell crank 48 which is of inverted T-shape, and as an upstanding arm 49 connected by means of a connecting rod 50 with the upper end of the arm 36. One of the arms of the T-shaped bell crank 48 is shown at 51 as extending in the general direction of the axle 27, and this arm 51 is connected by a link 52 with the outer end of one arm 53 of the bell crank 38, so that the other arm 54 of the bell crank will be disposed substantially diametrically opposite to the arm 36 and the arm 36 will extend radially upward from the axle 27, while the arm 54 will extend radially downward from the axle 27. The other arm of the inverted T-shaped lever is indicated at 55, and is connected by a link 56 with the crank pin 14. The arm 40 of the L-shaped bell crank is connected by a link 57 with the crank pin 14. The link 57 is of greater length than the arm 55 so that the diametrically opposite arms 36 and 54 and the diametrically opposite arms 35—47 will lie in planes which intersect each other at the axis of rotation of the axle 27. Each of the arms 35, 36, 47 and 54 carries a pivoted pawl 58 which is spring pressed against the cylindrical body portion of the spring pressed housing 32 in the plane of the slots 33 and the ratchet wheel 30, each of the pawls 58 being adapted to project through the corresponding slot 33 and to engage with the ratchet wheel 30 when the drum-shaped housing 32 is in the position shown in Figure 1. Each of the arms 35, 36, 47 and 54 also carries an oppositely extending spring pressed pivoted pawl 59, which I shall term a "reversing pawl". The pawls 59 are supported in the plane of the slots 34 and the ratchet wheel 31 and are spring pressed against the outer periphery of the cylindrical portion of the drum-shaped housing 32 in position to project through the slots 34 and to engage with the teeth of the ratchet wheel 31 when the drum-shaped housing 30 has been shifted from the position shown in Figure 1 to the position shown in Figure 3. This shifting of the drum-shaped housing can be conveniently effected by means of a handle 60 which is attached to the drum-shaped housing, and it may be actuated to shift the housing about the axis of the axle 27 and then may be releasably held in position to prevent accidental shifting of the housing 32 about the axis of the axle 27 by any suitable known means, none being shown.

The operation of the mechanism that has been described so far is substantially as follows. When the pinion operating shaft 60 has been turned to cause positioning of the crank pin 14 in line with the axis of rotation of the crank disk 1, it is obvious that rotation of the crank disk 1 will not cause rotation of the axle 27. However, as the crank pin 14 is shifted radially outward from dead center position, rotation of the crank disk will be accompanied by reciprocation of the connecting rods 50 and 57 and by oscillation of the levers 41 and 48 and of the arms 35, 36, 47 and 54. These arms 35, 36, 47 and 54 carry the pivoted spring pressed pawls for actuating the ratchet wheels. When the drum-shaped housing 32 has been adjusted as shown in Figure 1, the pawls 58 will be active and the pawls 59 will be prevented because of their engagement with imperforate portions of the housing 32 from engaging with the ratchet wheel 31. The rotation of the crank disk 1 and the consequent oscillation of the arms 35, 36, 47 and 54 will result in such actuation of the pawls 58 carried by these oscillating arms that rotation of the crank disk 1 in a clockwise direction from the position shown in Figure 1, will cause the pawls 58 carried by the arms 35, 36, 47 and 54 to act in turn sequentially to impart a tortional thrust to the ratchet wheel 30, whereby the axle 27 will be turned about its axis. The amplitude of oscillation of the respective arms 35, 36, 47 and 54 and therefore the amplitude of the torsional thrust on the ratchet wheel 30 by reason of the oscillation of the pawl carrying arms, will vary directly with the distance of the axis of the crank pin 14 from the axis of rotation of the crank disk 1, and therefore the speed of rotation of the axle 27 and of the wheels on which the axle is mounted may be varied within a considerable range while the crank disk 1 is turning at a constant speed by shifting the crank pin radially of the crank disk. In order to reverse the direction of rotation of the axle 27, it only is necessary to shift the drum-shaped housing 32 from the position shown in Figure 1 to the position shown in Figure 3 so that the pawls 59 will be permitted to project through the slots 34, and to engage with the ratchet wheel 31 while the pawls 58 are prevented from engaging with the ratchet wheel 30.

It is to be noted at this point that the direction of rotation of the crank disk 1 is immaterial so far as having any effect on the direction of rotation of the axle 27 is concerned. In Figure 6, I show a portion of a motion transmitting lever and link arrangement for transmitting motion from the crank pin 14 to a rotary member which is not shown, but which may be the axle 27 having the ratchet wheels 30 and 31 respectively mounted thereon in association with the drum-shaped ratchet wheel housing 32, and the sets of spaced pawls 58 and 59, the axle 27 however, being disposed in this instance with the axis of rotation thereof at right angles to the axis of rotation of the crank disk 1. Each set of pawls 58 and 59 in the transmission mechanism when the axis of the axle 27 is disposed at right angles to the axis of rotation of the crank disk 1, will be arranged to be actuated by a longitudinal reciprocating rod 70. Two vertically spaced reciprocating rods 70 are attached by horizontal pivot elements 71 to the adjacent ends of oppositely extending arms 72 of a pair of vertically spaced bell cranks 73. The bell cranks 73 have the hubs thereof extended laterally in opposite directions, as indicated at 74, and are pivotally supported as by means of the horizontal pivot elements 75 to swing about vertically spaced parallel horizontal axes. The pivot elements 27 are carried by vertical arms of brackets 76 which are stationary and may be fixed against movement in any suitable known manner, as by connection with stationary supporting arms 77. Each of the bell cranks 73 has the other arm thereof, indicated at 78, swivelly attached as at 79 to the arm 72 of that bell crank to swing about an axis which extends at right angles to the axis to which the bell crank 73 as a whole is supported to swing. The arms 78 of the respective bell cranks 73 are connected by universal joints 80 to the outer ends of a pair of diametrically opposite links 81 which are pivotally attached at their inner ends to alined oppositely extending vertical pairs of attaching ears 82, as by means of the horizontal pivot elements 83. The attaching ears 82 are carried on a hub 84 which is rotatably supported on the crank pin 14. The hub 84 also has horizontally alined oppositely extending pairs of ears 85 to which the inner ends of outwardly extending links 86 are attached by the pivot elements 87. The links 86 are connected at their outer ends by universal joints 88 to the inner ends of arms 89 of a pair of bell cranks 90 which are identical in essential respects with the bell cranks 73, and which also include arms 91 that are attached at their extremities by universal joints 92 to the adjacent ends of reciprocating rods 70 which lie in the same horizontal plane. The hubs of the bellcranks 90 are extended in the same manner as the hubs of the bellcranks 73 and the bell cranks 90 are pivotally supported on horizontal arms of the brackets 76 as by means of the vertical pivot elements 93, for swinging movement about spaced parallel vertical axes.

It of course will be understood that the arms 89 of the bell cranks 90 are swivelly attached to the arms 91 so that the arms 89 can swing about axes which extend at right angles to the direction of the axes about which the bell cranks 90 are mounted to swing as units.

Rotation of the crank disk 1 will cause reciprocation of the rods 70 so that the pawls with which the respective rods 70 may be connected, will be actuated sequentially in substantially the same manner as the pawls of the construction exhibited in Figure 1, and motion thus will be imparted to the rotary member that is to be driven.

Obviously, the invention is susceptible of embodiment in forms other than those which are illustrated in the accompanying drawings, and I therefore consider as my own all such modifications and adaptations thereof as fairly fall within the scope of the appended claim.

I claim:—

In a device of the character described, a tubular shaft having a longitudinal slot, a crank disk secured on an end portion of said tubular shaft and having a central opening concentric with said shaft, a circular guiding and retaining frame secured on said disk in eccentric relation to the disk, an internal ring gear rotatably supported in said guiding and supporting frame, a crank pin carried by said internal ring gear, a shaft partially received in said tubular shaft in concentric relation to the latter and extending through the central opening of the crank disk, a pinion secured to said last named shaft in mesh with the teeth of said internal ring gear, an inner sleeve slidable in said tubular shaft and having a projection extending through the slot in said tubular shaft, said sleeve and said inner shaft having cooperative co-engaging means whereby axial movement of said sleeve will cause rotation of said inner shaft, and means on said tubular shaft for sliding said sleeve within said tubular shaft.

EDWIN B. RAYNER.